(12) United States Patent
MacRae

(10) Patent No.: US 10,684,078 B1
(45) Date of Patent: Jun. 16, 2020

(54) METHOD FOR STABILIZING THERMAL CONDUCTION OF BLOCK COOLERS WITH CAST-IN COOLANT PIPES

(71) Applicant: MacRae Technologies, Inc., Hayward, CA (US)

(72) Inventor: Allan J. MacRae, Hayward, CA (US)

(73) Assignee: MacRae Technologies, Inc., Hayward, CA (US)

( * ) Notice: Subject to any disclaimer, the term of this patent is extended or adjusted under 35 U.S.C. 154(b) by 0 days.

(21) Appl. No.: 16/712,912

(22) Filed: Dec. 12, 2019

Related U.S. Application Data

(63) Continuation-in-part of application No. 16/422,909, filed on May 24, 2019.

(51) Int. Cl.
| | |
|---|---|
| C22C 33/00 | (2006.01) |
| F28D 15/02 | (2006.01) |
| C22C 33/02 | (2006.01) |
| G06F 30/23 | (2020.01) |
| G06F 30/28 | (2020.01) |

(52) U.S. Cl.
CPC ...... *F28D 15/0275* (2013.01); *C22C 33/0285* (2013.01); *G06F 30/23* (2020.01); *G06F 30/28* (2020.01)

(58) Field of Classification Search
CPC .................................. F27D 1/04; F27D 1/148
See application file for complete search history.

(56) References Cited

U.S. PATENT DOCUMENTS

| | | | |
|---|---|---|---|
| 3,853,309 A | 12/1974 | Widmer | |
| 6,280,681 B1 | 8/2001 | MacRae | |
| 9,121,076 B2 | 9/2015 | Smith et al. | |
| 2011/0088600 A1* | 4/2011 | MacRae | F27D 9/00 110/182.5 |

OTHER PUBLICATIONS

Pipe Coil Selection for Cast Copper Cooling Blocks, (c) 2001 Allan J. MacRae, Sulfide Smelting 2002 : proceedings of a symposium sponsored by the Extraction and Processing Division (EPD) of TMS (the Minerals, Metals & Materials Society) held during the 2002 TMS annual meeting in Seattle, Washington, Feb. 17-21, 2002. ISBN 0873395255.

(Continued)

*Primary Examiner* — Scott R Kastler
(74) *Attorney, Agent, or Firm* — Main Law Cafe

(57) ABSTRACT

Computer modelling methods and foundry methods for copper-nickel coolant pipes cast-in-copper coolers are combined. First, Computational Fluid Dynamics and/or Finite Element Analysis steps verify geometric computer aided design models and materials choices, point-by-point heat distribution, and heat flows. And second, casting steps to commit an acceptable last thickness iteration of a thermal buffer part in simulation to casting it in a foundry. In the foundry, casting conditions are empirically developed to yield all but slight, unclustered bonding imperfections at a concentric diffusion interface of the pipes and surrounding solidified casting that improve the thermal conductivity of furnace-block coolers that incorporate coolant pipes. The combined methods verify in simulation that operational thermal stresses at the pipe-casting interface stay in-bounds of material stress limits, and that the peak temperatures on the hot face do not rise above 450° C.

9 Claims, 8 Drawing Sheets

(56) References Cited

OTHER PUBLICATIONS

Figure 1:
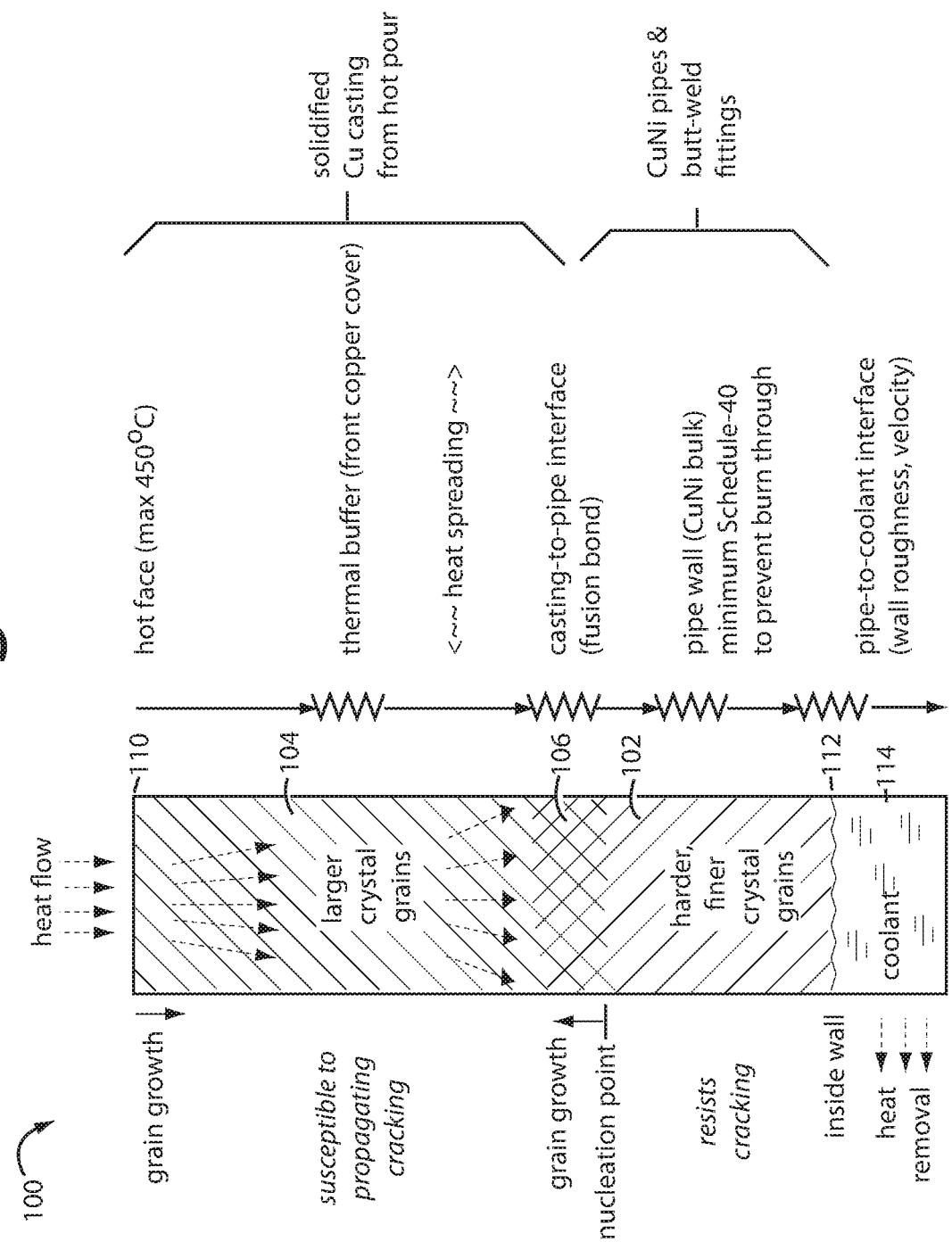

New Technology for the Manufacture of Cast Copper Cooling Blocks, Allan J. MacRae, Kvaerner E&C, ISS 59th Electric Furnace Conference, Phoenix, Arizona, Nov. 2001.

G. Slaven, A. MacRae, and L. Valentas, "The Implementation of Ultralife™ Copper Casting Technology in the EAF," AISE Annual Convention, Pittsburgh, Pennsylvania, Sep. 28-Oct. 1, 2003. RE Used the term "well bonded", but did not indicate that bonding could be 100%.

A. MacRae, J. Lenz, S-Furnace Roof Modifications, Falconbridge Limited, Timmins, Ontario, JOM, 58 (2006). RE Copper-nickel pipe coil for maximum bond between the pipes and the cast copper . . .

A. MacRae, "New Technology for the Manufacture of Cast Copper Cooling Blocks", ISS 59th, Electric Furnace Conference, Phoenix, Arizona, Nov. 11-14, 2001. RE De-bonding of the pipe from the copper due to thermal cycling is reduced due to a combination of improved bonding.

M.W.Kennedy, A.MacRae, R.T. Jones, L. Kolbeinsen, P. Nos, A. Filzwieser; Some_Considerations_For_Safer_Furnace_Cooling; Reference D2 in EPO Search and Written Opinion.

Apr. 3, 2020 International Search Report and the Written Opinion of the International Searching Authority (EPO); Applicant's or agents file reference MLF 657-48 PCT; International application No. PCT/US2020/015282; MacRae Technologies, Inc.

\* cited by examiner

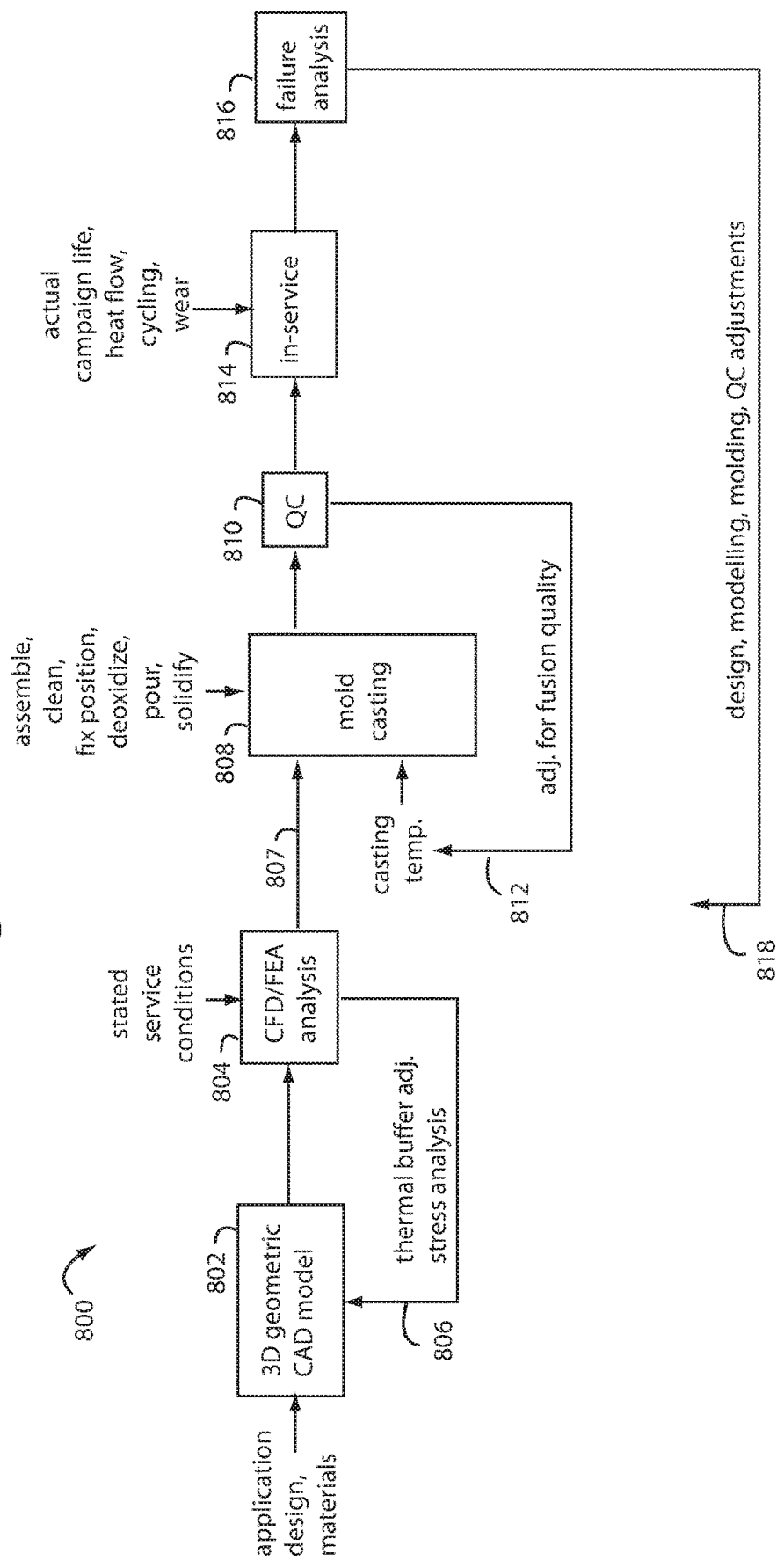

METHOD FOR STABILIZING THERMAL CONDUCTION OF BLOCK COOLERS WITH CAST-IN COOLANT PIPES

BACKGROUND DESCRIPTION

1. Field of the Invention

The present invention relates to methods for improving the thermal conductivity and efficiency of cast copper furnace-block coolers with coolant pipes, and more particularly to methods of manufacturing for fusing and metallurgically bonding copper-nickel (CuNi) alloy coolant pipes into their surrounding castings.

2. Description of the Prior Art

The furnace refractory walls and roofs of metallurgical furnaces can be exposed to chemically corrosive slag and thermal cycling, as well as melt penetration between brick and into the refractory brick matrix. Liquid-cooled copper blocks are widely used to halt high temperature corrosion and reduce the rate of erosion of the refractory, particularly in furnaces exposed to high heat fluxes. Liquid coolant can leak out when cracks develop in the copper blocks. Conventional furnace-block coolers have traditionally been manufactured from billet copper or as poured-into-mold castings. Fewer problems with coolant leakage have been realized for cast blocks with internal pipe coils because cracks do not readily propagate into and through the walls of the CuNi alloy coolant pipes. This is because pipes have a very fine crystal grain structure, and if the CuNi alloy coolant pipes are CuNi 70/30 alloys with nickel, the alloy will have a very much higher Vickers hardness that will combat cracking. Solidified copper castings on the other hand, have large crystal grain structures which are susceptible to crack propagation which initiate from any free surface or casting defect.

Using pipes to contain the liquid coolant has traditionally meant that the interface between the CuNi alloy coolant pipes and the castings will introduce a large degree of thermal resistance due to gaps or absence of bonding. Such thermal resistance can lead to separation of the pipe from the casting and local overheating. Thermally induced shear stresses will be generated at the pipe to cast copper interface due to the difference in thermal conductivities between the pipe and cast around copper. If there is little to no bond, the interface can rip open quickly thereby increasing thermal resistance over time.

Thermal shear forces across the interface in local hot spots can be large enough to tear the materials apart if the heat flows reach high enough levels. But if the CuNi alloy coolant pipes are CuNi 70/30 alloy, the outside surfaces of the CuNi alloy coolant pipes can bond and metallurgically fuse with the copper castings as they solidify in their sand molds. Such fused interfaces are highly thermally conductive, and thus can eliminate local hot spots if uniformly flawless. An obvious goal is to have complete uninterrupted bonds and metallurgical fusing across the entire area of the interface.

What is a sufficient degree of completeness, and how to achieve a practically complete uninterrupted bond and metallurgical fusing across the entire area of interface Cu castings and CuNi alloy coolant pipes has not heretofore been practiced in public.

A range of commercially available, standard copper alloys are suitable for pipe coils that can be manipulated to fuse in cast copper furnace-block coolers. A particular one is CuNi 70/30, which is roughly 70% Cu and 30% Ni alloy, with additions of iron and manganese. Metallurgical examination and destructive testing has been used in the past to compare the improvements in metallurgical bonding achievable over those cast copper furnace-block coolers manufactured with Monel-400 and other nickel-copper (NiCu) alloy pipes.

CuNi alloy coolant pipe coil alloys and associated casting techniques have resulted in cast copper furnace-block coolers that have greatly enhanced service life in high heat load applications compared to prior technologies. Early CuNi-pipe-cast-in-copper furnace-block coolers recognized that the harder CuNi alloy and fine grain crystal structures of pipes cast inside would arrest crack propagation in the surrounding large grain crystal structures of the castings in copper furnace-block coolers, and thus prevent a major cause of coolant leakage and failure. Moreover, since the CuNi alloy coolant pipes were made of CuNi, they would metallurgically fuse and bond inside the copper casting to yield the high levels of thermal conductivity and absence of local hot spots needed for newer furnace demands.

It has become apparent that if the metallurgical bonding and fusing between the CuNi alloy coolant pipe a Cu casting cannot be flawless, it must be only slightly incomplete and unclustered over the whole surface area of the interface between them. Otherwise destructive local hot spots will develop that can produce enough thermal shear force to de-bond the CuNi alloy coolant pipes and crack the bulk copper materials. De-bonded pipes and cracking in the bulk copper materials are prime reasons high heat flux furnace-block coolers fail.

SUMMARY OF THE INVENTION

Briefly, method embodiments of the present invention improve the thermal conductivity of furnace-block coolers that incorporate coolant pipes. The improved methods result in widespread, continuous metallurgical bonds and fusing of pipe-casting interfaces between CuNi alloy coolant pipes and their surrounding Cu castings. The fusion is comprehensive, unclustered, and never more than only slightly patchy or incomplete over its entire surface area. Operational thermal stresses at the pipe-casting interface are kept in-bounds by solidifying a thick, intrinsic cast copper thermal buffer about 25-32 millimeters (mm) thick, if a hot face pattern is included, or about 38-mm if the hot face is not patterned, between the hot face and the front-facing of the CuNi alloy coolant pipes. These methods include verifying that the operational conditions will be in-bound before any foundry casting. Computational Fluid Dynamics and Finite Element Analysis (CFD/FEA) tools, and a 3D-CAD model of the furnace-block cooler verify that the thermal buffer is substantial enough to spread the expected heat flows into the coolant pipes, and that the peak hot face temperatures will not rise above 450° C.

IN THE DRAWINGS

Figure 2:
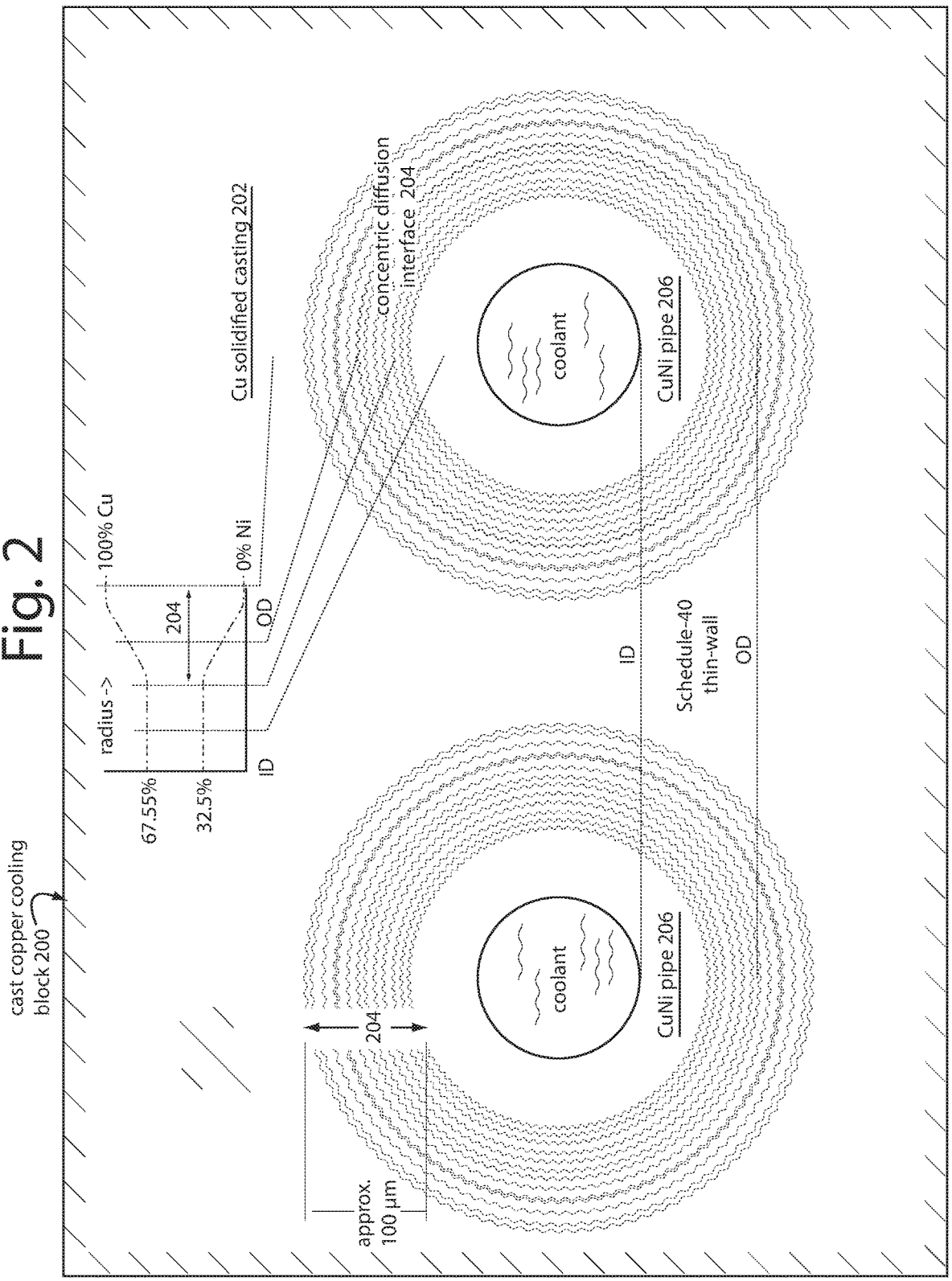
Figure 3:
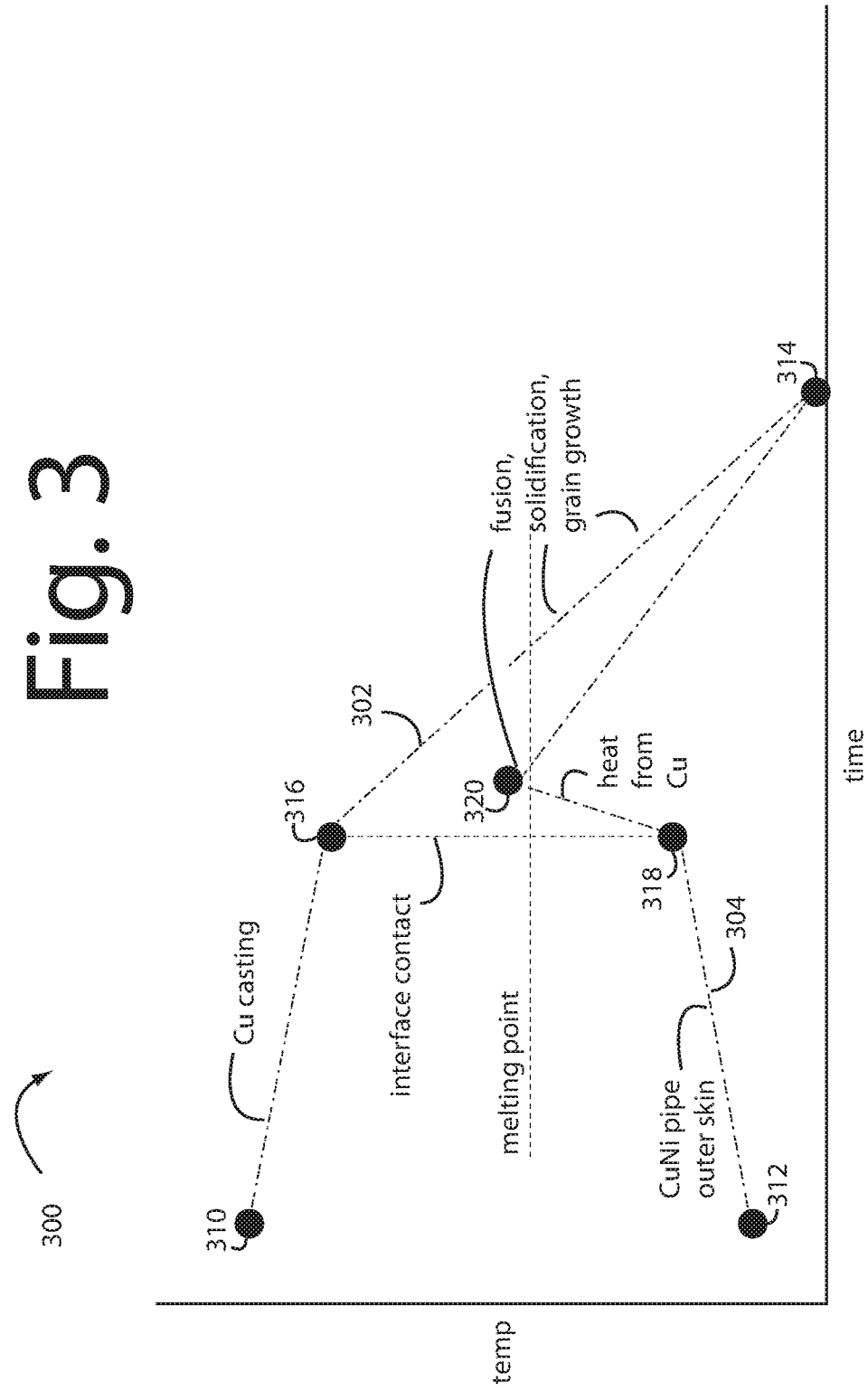
Figure 4:
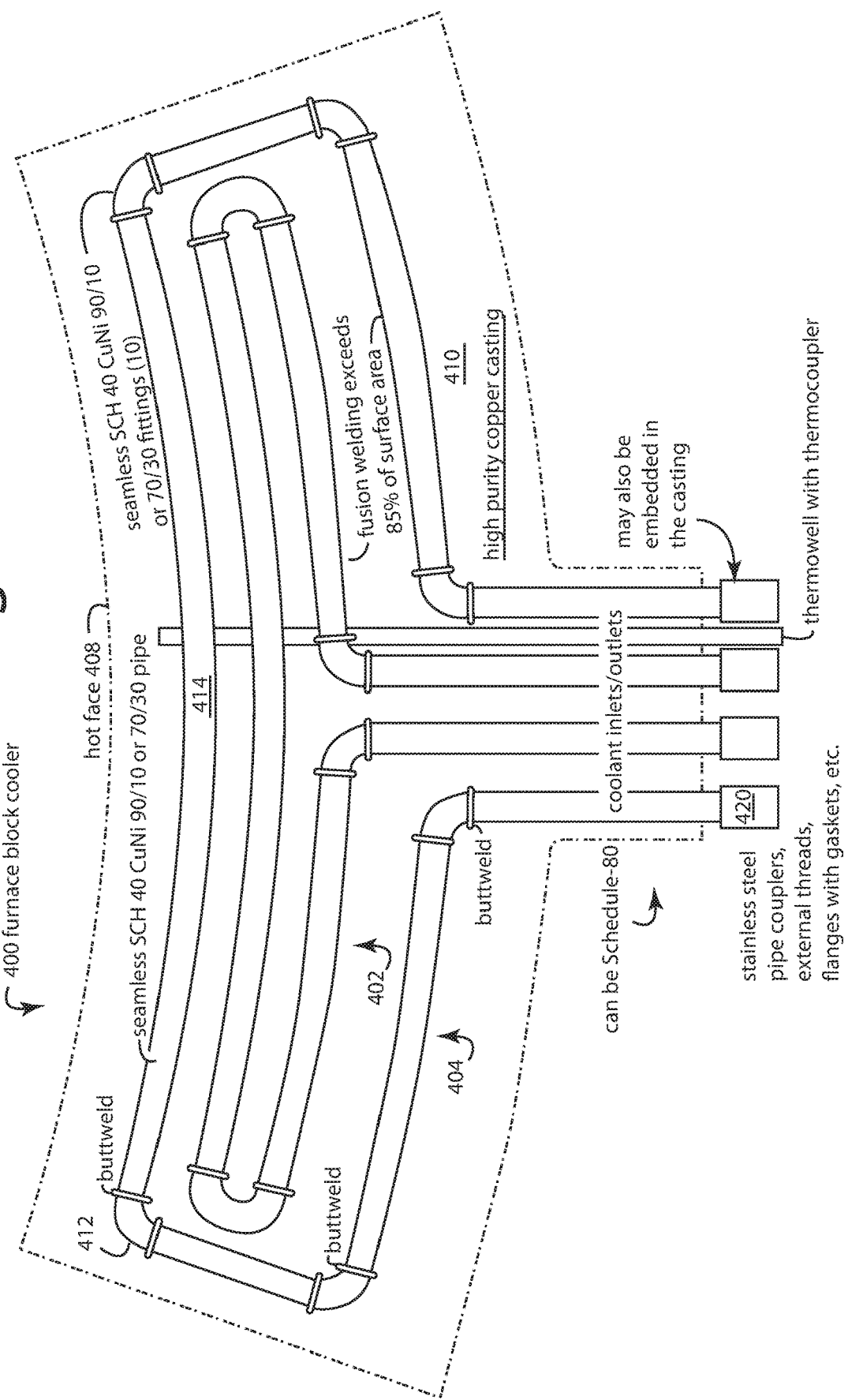
Figure 5:
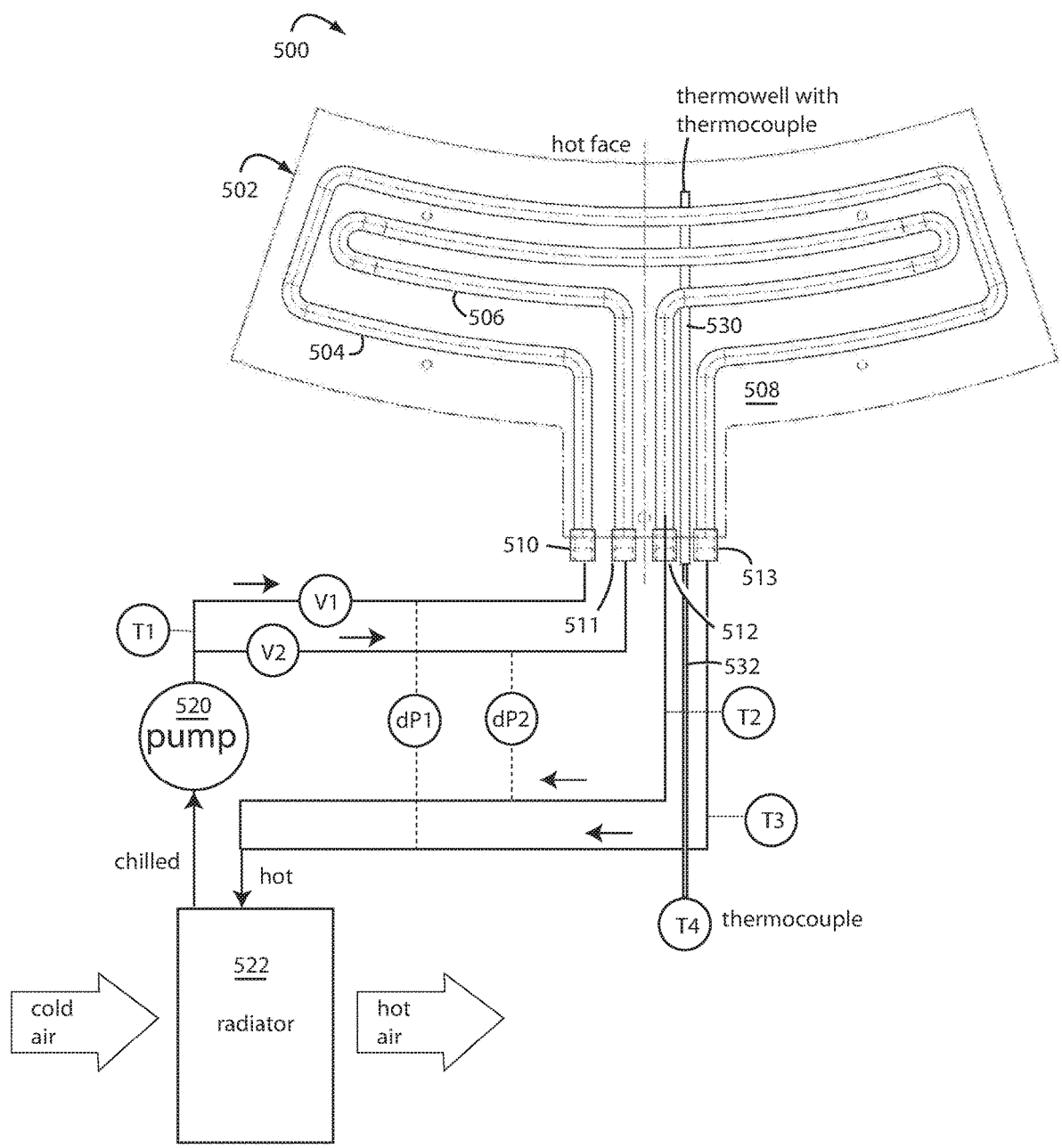
Figure 6:
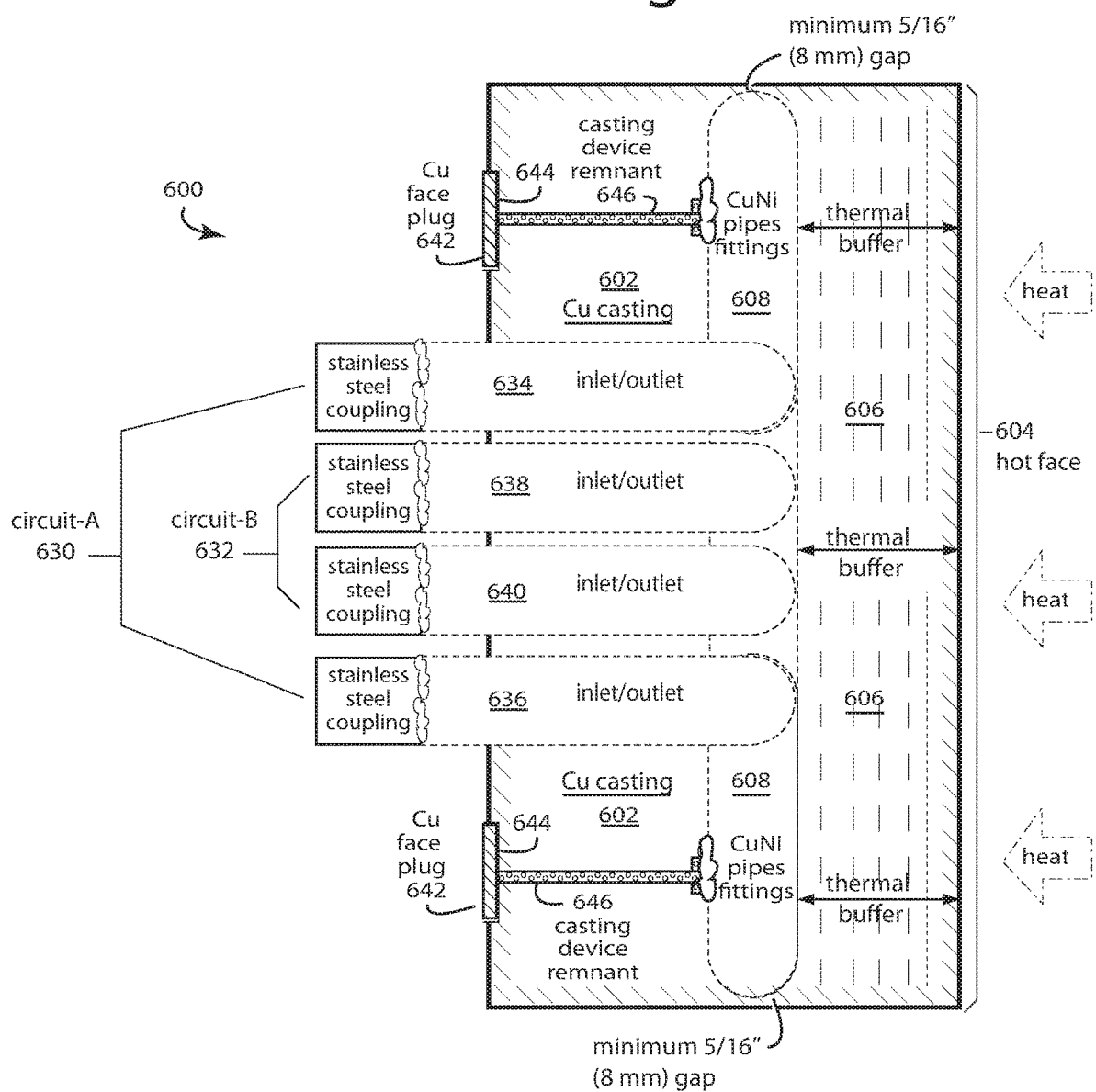
Figure 7:
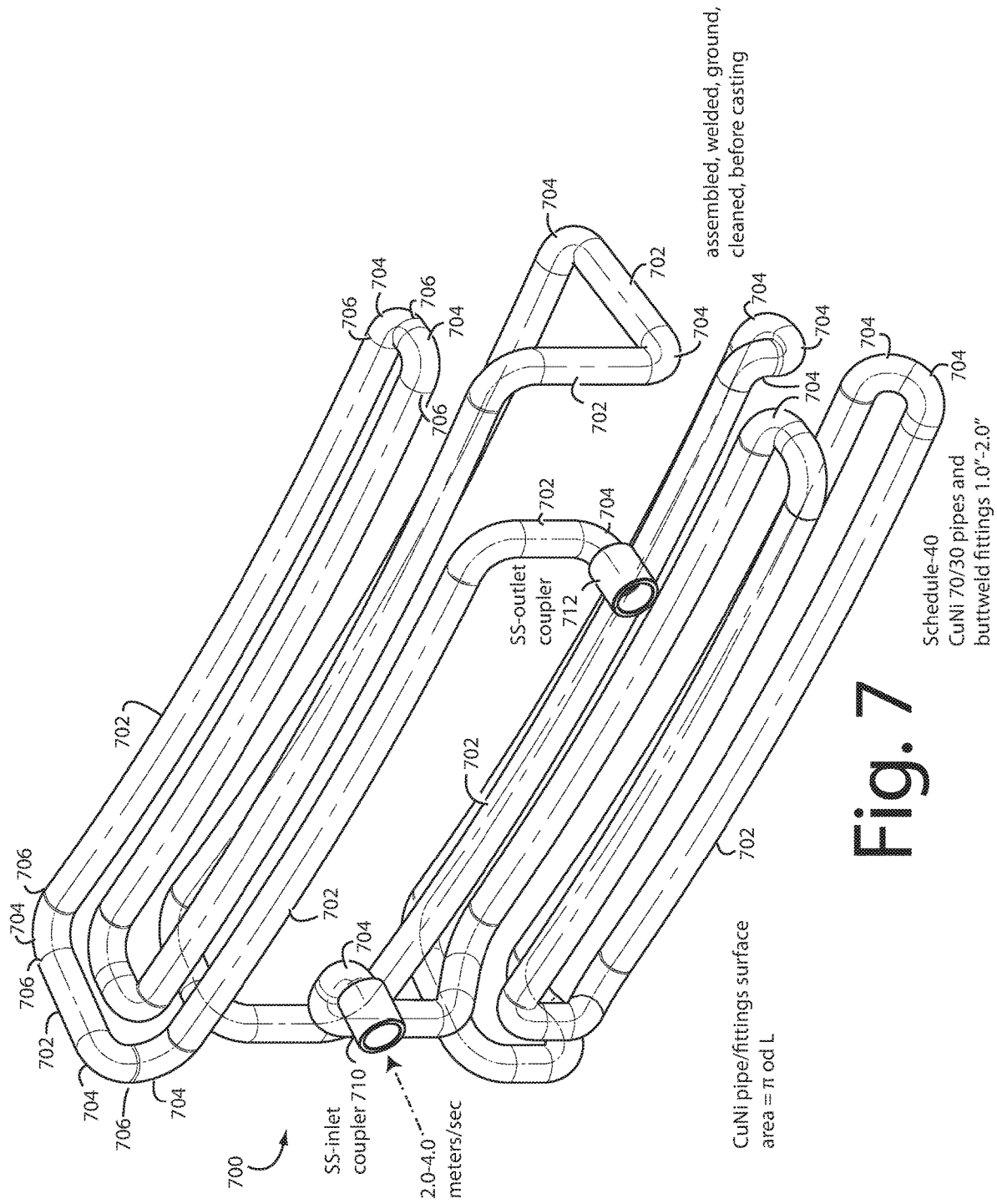

FIG. 1 is a schematic diagram representing a path of thermal conductivity in a core section of an cast copper furnace-block cooler and fused-in CuNi alloy coolant pipe embodiment of the present invention. The path proceeds from a hot face, through the bulk material of a thermal buffer, across a bonded and metallurgically fused interface between a copper casting and a CuNi alloy coolant pipe, and then through the pipe itself into a coolant circulating with a velocity as high as 4.0 meters per second;

FIG. 2 is a cross-sectional diagram (not proportionate nor to scale) of a slice through the cast copper furnace-block cooler and fused-in CuNi alloy coolant pipe embodiment of the present invention, as in FIG. 1. This cross section intersects the CuNi alloy coolant pipes at two places to show the structure inside the solidified casting between the CuNi alloy coolant pipes. Around each pipe there is a metallurgically fused, concentric, and continuously transitioning diffusion zone a-f that is roughly 100 µm thick;

FIG. 3 is a graph drawing of the temperatures of the copper casting and CuNi alloy coolant pipes over time from just before a hot liquid pour into the sand mold through complete solidification and cooldown. The object is to show that all the heat necessary to bond and metallurgically fuse the interfaces of FIGS. 1 and 2 comes solely from the introduction into the mold of a heated and liquefied casting copper, and that on mutual contact only a surface skin of the CuNi alloy coolant pipes raises above melting to fuse, and then only briefly;

FIG. 4 is a plan view diagram of an cast copper furnace-block cooler and fused-in CuNi alloy coolant pipe embodiment of the present invention. The sharpest "1D" bends are normally made with CuNi fittings butt-welded in with the CuNi alloy coolant pipes and assembled and tested before casting in the mold. Two independent and synonymous CuNi alloy coolant pipe circuits share the heat load coming in from a single hot face (shown here at the top);

FIG. 5 is a schematic diagram of a coolant system to support the independent and synonymous dual CuNi alloy coolant pipe circuit operation of an cast copper furnace-block cooler and fused-in CuNi alloy coolant pipe embodiment of the present invention, such as is similar to the examples of FIGS. 4 and 6;

FIG. 6 is a cross sectional view diagram (not proportionate nor to scale) of an furnace-block cooler embodiment of the present invention oriented in this illustration with the hot face to the right and the coolant pipe inlets/outlets on the left. The span of CuNi alloy coolant pipes are more or less consistently spaced away from the hot face by a consistent distance that is the thickness of the thermal buffer. Heat flow from the furnace is represented as incoming from the right;

FIG. 7 is a perspective view diagram of one of the independent and synonymous dual CuNi alloy coolant pipe circuits of an cast copper furnace-block cooler and fused-in CuNi alloy coolant pipe embodiment of the present invention, as in FIGS. 3, 4, and 6. A second such circuit would three dimensionally nest inside this one. It can be seen herein that the CuNi alloy coolant pipe circuit is an assembly of pipes, fittings, and couplings that are welded and bridged together before casting; and FIG. 8 is a functional block diagram of one way computer modelling is used to verify serviceable iterations of casting furnace-block cooler 3D-geometric computer aided design (3D-CAD) models and materials choices. The candidate iterations are verified before an acceptable last iteration is committed to casting in a foundry, such as by Computational Fluid Dynamics and Finite Element Analysis (CFD/FEA) tools, and a 3D-CAD model of the furnace-block cooler. Casting conditions are empirically developed to yield all but slight, unclustered bonding imperfections at the concentric diffusion interface of the pipes and surrounding solidified casting.

DETAILED DESCRIPTION OF THE PREFERRED EMBODIMENTS

Cast copper furnace-block coolers with fused-in copper-nickel (CuNi) pipe embodiments of the present invention for pyrometallurgical furnaces improve over prior furnace-block coolers. The improvements herein include a widespread, continuous metallurgical bonding and fusing of a concentric diffusion interface between the CuNi alloy coolant pipes and the surrounding Cu casting. The fusion bonding is never more than only slightly incomplete over its entire surface area. As a result, the thermal conductivity through the concentric diffusion interface is very high and about equal to the bulk CuNi material. Operational thermal stresses at the concentric diffusion interface are kept in-bounds of shear force limits by including a thick, intrinsic cast copper thermal buffer solidified between the hot face and the front-facing CuNi alloy coolant pipes.

Such thermal buffers are typically about 25-32 millimeters thick if the hot face is patterned, and about 38-mm if not. Such thicknesses do not introduce so much bulk material thermal resistance as to allow the hot face to rise above 450° C. during normal operation. Nor can the thermal buffer be much thinner than this as that would reduce its heat spreading effects and cause asymmetric heating inside the CuNi alloy coolant pipes and consequential coolant boiling.

Such thermal buffer's geometric conditions are verified as appropriate, before foundry casting, by Computational Fluid Dynamics and Finite Element Analysis (CFD/FEA) tools, and a 3D-CAD model of the furnace-block cooler.

Casting conditions are overall to result in all but slight and unclustered portions (<15% of total) of the outside surface area of the CuNi alloy coolant pipes metallurgically fusing at their concentric diffusion interface with the solidified casting. Years of experience and testing has led the present inventor to accept that "slight and unclustered portions (<15% of total)" can be dismissed in quality control without much ill effect in the service life of the furnace-block coolers.

Such years of experience and testing has also led the present inventor to understand as a rule-of-thumb that when the hot face rises above 450° C. during operation, unacceptable levels of thermal shear forces will develop at the concentric diffusion interface. And if oxygen is present, the hot face will oxidize and flake. Furnace operators are universally provided with temperature measurements and the means to dial back the heat.

FIG. 1 schematically represents a cast copper furnace-block cooler 100 with copper-nickel (CuNi) pipes 102 fused inside a surrounding copper casting and a front-facing thermal buffer 104 that improves over conventional cast copper furnace-block coolers. A metallurgical bonding and fusing of a pipe-to-casting concentric diffusion interface 106 between the CuNi alloy coolant pipe 102 and the Cu casting and thermal buffer 104 is only slightly incomplete over its entire surface area.

In prior work, the Present Inventor taught that "ASTM Schedule-40 pipe, or thinner, can therefore be used for the UNS-type C71500 copper-nickel alloy pipe coils." This turned out not to be true in practice. The CuNi alloy coolant pipe used herein cannot have a wall thickness thinner than ASTM Schedule-40 because burn-through of the walls during casting is all too easy without cooling. And cooling is strictly prohibited herein because such seriously interferes with crystal grain formation across the pipe-to-casting concentric diffusion interface 106. In order words, the pipe will not form proper metallurgical bonds with the casting.

The thermal buffer 104 distributes and moderates an incoming heat flow from a hot face 110 and spreads the heat flow across a span of multiple CuNi alloy coolant pipes 102. The intervening thermal resistance must not be so great as to allow any part of the hot face to exceed 450° C., as determined in computer modelling. Nor should the thermal buffer 104 be fabricated so lightly as to allow asymmetric heating on an inside 112 of the CuNi alloy coolant pipes 102 and consequential film boiling of a coolant 114. After years of design and implementation, the average thermal buffer is typically about 25-32 millimeters thick if the hot face is patterned, and about 38-mm if not. Such patterning usually comprises ridges, grooves, pocket, etc., to retain bricks and other refractory.

CFD/FEA computer modelling is used to verify that the inside wall temperature of the CuNi alloy coolant pipes 102 in operation will not exceed (1) a temperature expected to cause film boiling, or (2) chemical degradation of glycol or other cooling media.

Alternative embodiments of the present invention include weld overlays or calorization of the hot face with aluminum as a final step in manufacturing to protect the furnace-block coolers from wear, abrasion, corrosion, and burn through.

The operational temperature limits are verifiable and predictable as being inbounds from a 3D-CAD model of the furnace-block cooler before their casting in a foundry, e.g., using Computational Fluid Dynamics (CFD) and/or Finite Element Analysis (FEA) tools. For example, it can be predicted, given a starting thickness dimension for the thermal buffer, that the hot face will not operate above 450° C. and that there is enough extra material provided to account for predictable wear and corrosion. Casting conditions are herein to result in all but slight, unclustered portions (<15% of total) of the outside surface area and concentric diffusion interface 106 of the CuNi alloy coolant pipes metallurgically fusing and thus able to provide a good thermally conductive bridge in the concentric diffusion interface.

The surrounding pipe-to-casting concentric diffusion interface 106 is a metal alloy diffusion that bridges a thickness of about 100-micrometers between an inner base metal in the CuNi material unaffected by heat, and into the solidified casting. A heat affected zone (HAZ) within concentric diffusion interface 106 comprises a tempered, a partially transformed, a recrystallized, and a grain-growth nucleation zone. Outside from these is a solid-liquid boundary into a fused zone (FZ) of solidified pure copper.

If the CuNi material in the CuNi alloy coolant pipes 102 that is unaffected by heat is an alloy 67.5% Cu and 32.5% Ni, the surrounding concentric diffusion interface 106 will continuously transition through alloys (e.g., 79.4% Cu and 20.6% Ni, 90.8% Cu and 9.2% Ni, 97% Cu and 3% Ni, 99% Cu and 1% Ni), and finally into the nearly 100% Cu and 0% Ni of the casting 104.

The nucleation points that occur during solidification are fixed in the outer edges of the sand mold and in the surface areas of the CuNi alloy coolant pipes and fittings. The grains of copper crystal constituting the fusion grow into the bulk of the copper casting as it solidifies. The copper crystal grains at these nucleation points will be the smallest in size because the copper is cooling first and then more rapidly here. In general, copper crystal grain sizes throughout the bulk will be random sized and generally exceed six millimeters after complete solidification.

CuNi-pipe-cast-in-copper furnace-block coolers require tight controls to eliminate casting defects. Fusion bonds between the outside surface area of the CuNi alloy coolant pipes that is too shallow, too deep, or not sufficiently widespread are defects. All but slight, unclustered portions (<15% of total) of the total outside surface area of the CuNi alloy coolant pipes with the Cu casting is necessary in high heat flux regime applications that exceed 25 kW/m$^2$ on the hot faces.

FIG. 2 represents a copper casting furnace-block cooler 200 produced in a foundry by method embodiments of the present invention, and in which the CuNi alloy coolant pipes and fittings are like those of FIGS. 4-7, and have been metallurgically fused by the heat of a surrounding copper casting 202 when it was poured in hot and liquid, then cooled and solidified in a mold. A concentric diffusion interface 204 about 100 μm thick, and with crystal grain growth, is self formed when casting all around a respective CuNi alloy coolant pipe section 206. The thermal conductivity through concentric diffusion interface 204 is quite good, on the order of the bulk copper of the casting and the CuNi alloy coolant pipe walls. If metallurgical bonds were not uniformly established in the concentric diffusion interface 204, the thermal resistance would be relatively quite high. Hot spots and thermal shear forces will develop wherever the metallurgical bonds failed to materialize.

Here, FIG. 2 represents with the insert chart of alloy-versus-radial-position, that the concentric diffusion interface 204 continuously transitions through a stratified blend of copper alloys from 100% Cu and 0% Ni in the solidified casting 202, and changes continuously (not in steps) to the 67.5% Cu and 32.5% Ni of the walls of the CuNi alloy coolant pipe 206. (The inner walls never melt and their CuNi alloying is unaffected.)

FIG. 3 is a graph drawing of the temperatures of the copper casting 202 (FIG. 2) and outer skins of the CuNi alloy coolant pipes 206 over time from just before a hot liquid is poured into the sand mold, then through complete solidification and cooldown. The object is to show that all the heat necessary for bonding and metallurgical fusing occurring in the concentric diffusion interfaces 106 and 204 of FIGS. 1 and 2 comes solely from the heated and liquefied casting copper introduced to the mold.

The various temperatures, geometries, and materials employed by the foundry are expertly manipulated such that on mutual contact, only a shallow surface skin part of the CuNi alloy coolant pipes raises above melting. And then only briefly.

FIG. 3 is a temperature-versus-time profile 300 for both the copper of a casting 302 and a CuNi alloy coolant pipe 304, starting at the points-in-time 310, 312 just before a hot liquid copper is poured into the mold to flood over the CuNi alloy coolant pipe. The profile 300 continues on until a point-in-time 314 when solidification is complete.

Initially, before solidification, the Cu casting 302 must be substantially hotter at point-in-time 310 than the melting point of copper. Similarly, at the start, the CuNi alloy coolant pipe 304 must be solid and therefore substantially below the melting point of copper at point-in-time 312. The two eventually come into contact with one another at point-in-time 316 (for the Cu copper 302) and point-in-time 318 (for the CuNi alloy coolant pipe 304).

The contact of the hot liquid Cu casting 302 with both the CuNi alloy coolant pipe 304 and the walls of the mold take heat away. The outside skin of the CuNi alloy coolant pipe 304 rises rapidly with the taken heat to just above melting at point-in-time 320.

FIG. 4 is a plan view diagram of a cast copper furnace-block cooler and fused-in CuNi alloy coolant pipe embodiment 400 of the present invention. Two independent and synonymous CuNi alloy coolant pipe circuits 402 and 404 together share a heat load 406 coming in from a single hot face 408. These are simultaneously cast inside a copper casting 410 with the aid of metal chaplets, spacers, and bridging (not shown). The sharpest "1D" bends are normally made with CuNi fittings 412 butt-welded in with the CuNi alloy coolant pipes 414 and assembled and tested before casting in the mold. Each independent and synonymous CuNi alloy coolant pipe circuit terminates externally with factory welded stainless steel, external threads, flanges with gaskets, or other common types of inlet/outlet couplings 420.

CuNi alloy coolant pipes are very difficult to weld together in the field. And so some embodiments of the furnace-block coolers herein require stainless steel couplers at the ends of the pipe inlets and outlets that are often partially embedded into the casting. The difficult, specialty welds of CuNi to stainless steel are exclusively done in the factory as part of the assembling of the ASTM Schedule-40 CuNi 70/30 standard 1.0", 1.25", 1.50", 1.75", and 2.0" pipes and butt-fuse fittings before casting. Factories have the right environmental conditions, specialty equipment, and trained personnel to make good welds.

The CuNi alloy coolant pipes and fittings are preferably butt-welded together using TIG/GTAW. The CuNi alloy coolant pipes and fittings with 70/30 alloy is the most common material, but 90/10 alloy is possible.

Butt-welds are required at the fittings which often become necessary for complex and lengthy pipe coils. The butt-fused ends are beveled 37.5°+2.5° to penetration, especially in the larger diameters of 1.0", 1.25", 1.50", 1.75", and 2.0" inches.

One diameter (1D) radius bends are normally implemented with butt-weld fittings, and 1.5D or larger bends can be seamlessly cold formed or hot formed without much difficulty. For a 1.0 inch ASTM Schedule-40 pipe, with an OD of 1.315 inches, the center line bend radius is 1.0 inch for short radius and 1.5 inch for long radius.

The most commonly used pipe sizes are 1.0-2.0 inch, all ASTM Schedule-40. It is uncommon to go outside this, e.g., 0.75 inch and 2.5 inch can be used, but less often.

Seamless pipes/fittings are always preferred.

ASTM Schedule-80 is preferred sometimes for the external inlets and outlets, for increased strength. Cast in thermowells commonly use ASTM Schedule-80. CuNi is also preferred for embedded thermowells in order to achieve metallurgical bonding and accurate temperature readings. And so, the accuracy of temperature readings obtained by thermocouples is improved by embedding and metallurgical bonding a thermowell or tubing of copper-nickel alloy in a method step of solidifying.

FIG. 5 represents a cooling system 500 that comprises a furnace-block cooler 502 with two CuNi alloy coolant pipe circuits 504 and 506 continuously metallurgically fused for practically all the surface area of their concentric diffusion interface with a surrounding copper casting 508. Coolant, such as glycol and water, is pumped under pressure into a first inlet coupler 510 and a second inlet coupler 511 at near identical velocities, V1 and V2, and whose maximum averages range from 2-4 meters per second. A first outlet coupler 512 and a second outlet coupler 513 return coolant for chilling and recirculation, but at a reduced pressure due to respective pressure drops through the two CuNi alloy coolant pipe circuits 504 and 506.

Differential pressure drops, dP1 and dP2, reflect the internal flow resistance of each of the two CuNi alloy coolant pipe circuits 504 and 506. Ideally, the internal geometries will be about equal and dP1 will about approximate dP2 when V1 is the same as V2 and both are in the maximum coolant velocity range of 2-4 meters per second (m/s). Temperatures T1-T3 are used by operators to estimate the heat flow being carried away, and temperature T4 can provide a measurement of the hot face temperature. The chilling and recirculation are provided by a pump 520 and a radiator 522. A thermowell 530 provides access to measure a hot face or other critical temperature of furnace-block cooler 500 with a thermocouple 532.

The minimum average coolant fluid velocity should be at least 0.9 meters per second to flush out any initial air and bubbles in the pipe such as may be due to incipient boiling. A maximum fluid velocity of two meters per second (2 m/s) is normally preferred for most applications, but a maximum up to four meters per second (4 m/s) will be required for steady state high heat flux applications. 4 m/s is usually needed for tapholes, and other furnace-block coolers with highly variable heat loads.

Steam bubbles dramatically reduce the ability of the coolant to absorb and carry away heat. So flow velocities of the coolant must be maintained high enough to prevent their formation. But flow velocities exceeding 4 m/s provide only diminishing returns, and produce costly pressure drops between the inlets and outlets.

Various absolute temperatures (T1:T3), and differential temperatures (|T1-T2|; |T1-T3|), and differential pressures (dP1:dP2) are monitored during operation. Alarms are annunciated to the operators if any measurements move out of pre-established normal bounds. The operator can thus be informed of an operational need to remove heat, energy, fuel, or feed to bring conditions back into normal limits.

A furnace-block cooler 600 is shown in FIG. 6 to comprise a sand casting 602 of high purity copper. A portion of the three-dimensional volume of sand casting 602, solidified from high purity liquid copper, between an external hot face 604 and a front row of CuNi alloy coolant pipes 608, operates as a thermal buffer 606. Thermal buffer 606 spreads, distributes, and moderates incoming heat flows from hot face 604 roughly equally across the span of front row of coolant pipes 608. The span of the nearest CuNi alloy coolant pipes are more or less consistently spaced away from the hot face 604 by a consistent distance that is the thickness of the thermal buffer 606, typically 25-32 mm thick from the hot face of the pipe 608 to the cold face of the hot face pattern, or about 38 mm if there is no hot face pattern. (Hot face patterns are used to hold bricks and/or refractory.) Thermal buffer 606 is alternatively referred to herein as a front copper cover because it is positioned on a "front side" that shares hot face 604.

Furnace-block cooler 600 comprises two independent coolant pipe circuits A-B, 630 and 632. They each respectively terminate in inlet/outlets 634, 636, 638, and 640. Some are finished with stainless steel couplers that are welded on in the factory or foundry. In other embodiments of the present invention, the inlet/outlets 634, 636, 638, and 640 are fabricated from heavier ASTM Schedule-80 parts, to add to their mechanical strength and durability.

A copper weld or face plug 642 is installed, inlet or welded flush inside a ground-out pocket 644 in surface of the copper casting 602 to cover any part of a chaplet, spacer, or other molding device 646 that would otherwise penetrate the surface and be exposed.

The two individual pipe coil circuits A-B 630 and 632 are preferably dimensioned and constructed to deliver near identical drops in pressure from the inlets to the outlets when coolant is flowing. The two individual pipe coil circuits A-B 630 and 632 can then be advantageously plumbed to share the heat load between them. Of course, additional such pipe coil circuits are also possible, and desirable. More than one independent pipe coil circuit per furnace-block cooler can be leveraged to provide for safe shutdowns should any one of the pipe coil circuits fail.

Herein, CuNi alloy coolant pipes here all preferably comprise commercially standard alloys of copper-nickel (CuNi) that are over 62% copper and available in ASTM Schedule-40 and ASTM Schedule-80. A simple hot liquid casting pour of high purity copper with these pipes and fittings inside the mold is such that they briefly gain enough heat during cooldown and solidification to fuse, grow crystal grains, and metallurgically bond the outside surface area of the CuNi alloy coolant pipes and fittings to the newly solidifying and surrounding casting.

The entire fusion bonding of the concentric diffusion interface must be consistently good, and only slightly less than flawless, e.g., over 85% or better of the total surface area. Experience and testing over the years has shown that such 85% is a cutoff or minimum will produce acceptable performance. The front copper cover 606 that solidifies thereafter inside the sand casting 602 is characterized by an exceedingly low and stable thermal resistance from the hot face 604 on into the CuNi alloy coolant circulated inside the front row of coolant pipes 608. That is, if it is to succeed in high heat flux applications.

The CuNi alloy pipe and fittings must be thin-wall (e.g., ASTM Schedule-40) to permit dense packing of loops, minimal thermal resistance, and generally greater than 62% copper to develop sufficient fusion bonding. The outermost skins of the CuNi alloy coolant pipes and fittings must only just melt enough to reach fusion bonding conditions, e.g., point 320 of FIG. 3. Without "burn-through".

Since such CuNi alloy coolant pipes may also soften generally when heated like this, the CuNi alloy coolant pipes and fittings here must be packed with sand to prevent deformations of the pipe walls during hottest temperature peaks of the single super-heated casting pour. Success in preventing deformations can be tested by an industry standard ball-test that passes a critically sized diameter ball through between the inlets and outlets 634, 636, 638, and 640.

In all method embodiments of the present invention, it is imperative that the sand casting molds remain mechanically still and free of vibrations during the time between the pour and its eventual solidification. Attempts to cool the CuNi alloy coolant pipes during casting can create vibrations from boiling that will shake and interfere with crystal grain formation and fusion bonding.

Conventional attempts to cool the CuNi alloy coolant pipes have caused differential expansions and contractions between the CuNi alloy coolant pipes/fittings and the casting just as they are tentatively fusing together. The CuNi alloy coolant pipes when cooled down can lock-in significant shear forces capable of debonding the CuNi alloy coolant pipes later when the furnace-block cooler is thermally cycled.

Coolant pipes are best constructed of industry standard and commercially available thin-wall CuNi alloy coolant pipes and fittings. Thin-walled pipes with butt-welded fittings are preferred because the loops and coils made of them can be turned tighter. ASTM Schedule-40 is thus favored, as are standardized CuNi alloys of UNS types C70600, C71300, C71500, and C71640.

The furnace-block coolers 600 here are computer modelled using CFD/FEA techniques for operation at very high heat flows applied to the hot face that exceed 25 kW/m$^2$. In these high heat flux regimes, problematic hot spots can easily develop internally around local concentrations in thermal resistance.

Points inside the casting 602 that didn't fuse, or that have crystalline defects, porosity, foreign matter, gas products, debris, or occlusions are prone to separation and cracking because thermally induced shear forces will develop locally across the defects. The inside turns of pipe are a common site of failures to bond.

Stress concentrations increase proportionately with the local thermal resistance. The temperature differential that can develop across the thermal resistance can be self-amplifying, and the condition can runaway and only worsen under thermal cycling. CFD/FEA computer modeling must be used to verify that each particular design iteration will survive its maximum stated boundary conditions. These include sustained heat fluxes that occur during furnace upsets.

In manufacturing, X-rays, ultrasonic, and infrared testing quality control are nondestructive ways to check after casting if the CuNi alloy coolant pipes and fittings are consistently bonded to the copper casting over the 85% minimum area. Bonding is confirmable in ultrasonic testing when the echoes return from the inside of the CuNi alloy coolant pipes and fittings rather than their outside skins. The areas of pipe-casting fusion can be confirmed too with destructive testing that tries to chisel apart the CuNi alloy coolant pipes from the casting. If a chisel can separate the pipe from the casting, they were not fused.

Any local spots where the CuNi alloy coolant pipes are not actually fused to the casting will permit thin air gaps to open up that are highly insulating. The design goal is to run the furnace-block coolers with uniform temperatures throughout, any thin air gaps defeat this.

Adequate coverage and flow of hot liquid copper, and then a complete fill of solidified copper must be assured on the surface edges of the furnace-block cooler 600 where any part of the CuNi alloy coolant pipes 608 internally near any surface.

At least one, and better two or more, grains of crystalline copper must cover the CuNi alloy coolant pipes and fittings with an average of approximately ¼" (six millimeters). The size of the grains that form depend on how quickly the liquid copper in any one spot in the mold cooled. The casting solidifies first on the outside edges of the molds and at any contact with a "chill" such as the CuNi alloy coolant pipes. Larger crystal grains will be prevented from forming if the liquid copper cools too quickly and/or the gap is less than 5/16" (7.9 mm), see FIG. 6.

Therefore, embodiments of the present invention include a minimum gap of 5/16" (7.9 mm) internally between the CuNi alloy coolant pipes and any surface of the casting before any final surface machining, except at the respective coolant inlets and outlets.

If these minimum gaps are not provided during molding, linear defects can form in the solidified crystalline copper structure that will readily crack and easily lose mechanical integrity. Here we use pipes, so a loss of coolant is unlikely, but cracking is always to be avoided.

The front copper cover 606 must be completely devoid of any inclusions or extra components like chaplets, spacers, and other molding devices and supports used during the casting pour to hold and position coolant pipes 608. That means these devices must be installed deeper, or even on the rear side behind the front row of coolant pipes 608. Such extra components can lead to hot spots, high stress, and preferential corrosion, and so are to be minimized and sidelined.

Any water moisture on the surfaces of the CuNi alloy coolant pipes and fittings prior to molding can be driven off by preheating the front row of coolant pipes 608, but only after a thorough cleaning to rid them of oils, iron and other residues. (Iron residues in hot liquid copper in particular generate a lot of gases that solidify as impurities and voids.)

The final thickness dimension of the front copper cover 606 is a function of the depth the front row of coolant pipes 608 are set away from the hot face 604 during the casting pour. The more depth, the more thickness, and the more thermal buffering in effect.

The particular thickness of the front copper cover 606 can be confirmed as being adequate iteratively in CFD/FEA computer modelling. An allowance of additional material is included for wear given expected corrosion, abrasion, and oxidation rates over a campaign life. More material must be added for any unavoidable pipe shifting that can cause position uncertainty during the casting pour.

The front facing hemispheres of the front row of coolant pipes 608 will typically receive 70% of the heat flowing in from hot face 604. The thermal buffering of front copper cover 606 mitigates the effects of the front facing hemispheres running hotter. Without such thermal buffering, coolant inside the front facing hemispheres can boil prematurely.

In summary, all but slight, unclustered portions (<15% of total) of the total outside surface area of the CuNi alloy coolant pipes fusing with the Cu casting is obtainable by (1) using deoxidants or inert atmospheres during the casting, (2) not cooling the CuNi alloy coolant pipes, (3) thorough cleaning the CuNi alloy coolant pipes just prior to casting, and (4) finding the best casting temperatures for the pour given the particular design geometry, materials, and mold patterns.

The hot liquid copper casting will begin its solidification where it is chilled by contact with the mold, any chills, any chaplets or spacers, and of course contact with the CuNi alloy coolant pipes. But before that happens, the UNS-type C71500 pipe alloy will not begin to melt itself until it rises to about 1125° C. (2150° F.). Casting conditions must be carefully cultivated for the CuNi alloy coolant pipe surfaces to peak to those temperatures before cooling back. The thermal energy to do this can come only from the hot liquid casting pour introduced at a "best" casting temperature. Much of this technology can only be derived empirically.

A chill is a metal device used to promote solidification in a specific portion of a metal casting mold. Normally the metal in a mold cools at a rate relative to thickness of the casting. If the geometry of the molding cavity prevents directional solidification from occurring naturally, a chill can be strategically placed to help correct it.

The CuNi alloy coolant pipes must be supported briefly in the mold to prevent flotation in the molten copper, any horizontal shifting, and still allow for expansion and contraction of the pipes with the temperature excursions of the solidifying copper.

Nucleation begins at these points in the CuNi alloy coolant pipe surfaces and the copper crystal grains grow thence into the interior until the whole solidifies. The fact that any part of total outside surface area of the CuNi alloy coolant pipes has fused with the Cu casting is verified in quality control (QC) with non-destructive x-ray and ultrasonic imaging. An 85% threshold is used in QC to cull defective units from production that are not up to standard.

The average depth that any part of total outside surface area of the CuNi alloy coolant pipes has fused with the Cu casting is first validated with CFD/FEA. Achieving that in production will be a balance between concentric diffusion interfaces that fail in x-ray ultrasonic imaging to show fusion, and ball-tests of the CuNi alloy coolant pipes to verify no parts of the pipe walls have either collapsed or distorted significantly because they were overly softened by too much heat coming from too high a casting temperature. Destructive testing and metallurgical analysis can provide more precise data about the degree of fusion bonding actually being achieved during molding.

The adequacy of a particular CuNi-pipe-cast-in-copper furnace-block cooler's 3D geometric design and constituent materials are verified before casting in a foundry by Computational Fluid Dynamics and Finite Element Analysis (CFD/FEA) tools, and a 3D-geometric computer aided design (CAD) model of the furnace-block cooler. Such is typically outsourced to expert engineering services firms. Foundries often employ solidification modelling to ensure that shrinkage defects and voids are not likely to appear in the finished castings.

CuNi alloy coolant pipes should be one piece of smooth wall UNS-type C71500 ASTM Schedule-40 water pipe-cast inside a pour of electrolytic copper UNS-type C11000 de-oxidized during the casting process to produce a high-copper approximating UNS-type 81200. The prior art did not teach that the CuNi alloy coolant pipes should include butt-welded fittings for any 1D bends (short radius), nor that the range of sizes is best limited to 1.0", 1.25", 1.50", 1.75", and 2.0". These are practical necessities to yield an economic and profitable product.

A thick thermal buffer of solid copper is necessary to distribute the incoming heat flux from the hot face amongst the nearest CuNi alloy coolant pipes and fittings. Too little thermal buffering can allow hotspots and associated localized coolant boiling. The right thickness of solid copper for thermal buffering in each particular design and application is determinable with 3D CAD and CFD/FEA computer modelling.

Wear from abrasion and corrosion on the hot face must be accounted for with an added reserve of material if the furnace-block cooler is to survive its appointed campaign life.

FIG. 8 represents a method 800 in an embodiment of the present invention for manufacturing CuNi-pipe-cast-in-copper furnace-block coolers. A first part of method 800 includes a number of steps 802-810 that a manufacturer (foundry) can take to produce a furnace-block cooler suitable for long service. The second part represents a series of long range steps 814-818 a professional design engineering and consulting firm can apply to their applications, designs, assumptions, and methods in a next generation of furnace-block cooler products and services. In practice, foundries and engineering services firms work closely together to fit and install CuNi-pipe-cast-in-copper furnace-block coolers in the pyrometallurgical furnaces of end-users.

Computer modelling methods and copper-nickel pipe cast in copper cooler foundry methods are combined in method 800. First, to verify serviceable casting iterations of furnace-block cooler 3D-geometric computer aided design (3D-CAD) models and materials choices in step 802. And second, after candidate iterations are verified in steps 804, 806, an acceptable last iteration 807 is committed to casting in a foundry in step 808.

Computational Fluid Dynamics and Finite Element Analysis (CFD/FEA), and a 3D-CAD model of the furnace-block cooler steps 802-807 are usually outsourced to specialists by each copper casting foundry. In the foundry, casting conditions in steps 808-812 are empirically developed to yield all but slight, unclustered bonding imperfections at the concentric diffusion interface of the pipes and surrounding solidified casting that improve the thermal conductivity of furnace-block coolers that incorporate coolant pipes.

These methods keep operational thermal stresses at the pipe-casting interface in-bounds by solidifying a thick, intrinsic cast copper thermal buffer about 25-38 millimeters (mm) thick. The peak hot face temperatures should not rise above 450° C. in service.

The Foundry will build their own proprietary molds that include trade secret chaplets, chills, and other devices within the mold to control solidification and to prevent the shifting and floatation of the CuNi alloy coolant pipes during the casting pour. Very often the best casting temperatures to use in each instance will be kept by a Foundry as a trade secret. Such lessons are usually hard-won over many years of industry experience.

Conventional chaplets and spacers are metal supports that are placed in a mold cavity to hold internal sand cores and pipes in place. Here, chaplets are normally copper alloy metal supports welded at a proximal end to the rear side of the CuNi alloy coolant pipes/fittings to resist flotation and hold them in place inside the cope portion of the mold cavity. These chaplets fuse to become a part of the casting itself, through the fusion of the surrounding molten metal in the mold cavity with the chaplet. And so the chaplet composition must be suitable. The size of such chaplets must be properly proportioned to the thickness of the part of the casting in which it is used. All chaplets must be made from the least amount of material possible, otherwise poor fusion and cracking can result locally at the site of the chaplet due to unwanted chilling. Perforations in the chaplets in some embodiments can reduce the amount of chaplet material used and left behind. Any distal ends of the chaplets that penetrate the outside surfaces of the casting are ground down, inlet, and relieved such that copper plugs, welds and flush machined covers can be included that match the copper of the casting.

Several constituent parts add up to the total thermal resistance to the incoming heat flux from the hot face to the coolant. First, there is the thermal resistance of the bulk copper material of the casting between the hot face and the nearest parts of the coolant pipe circuit.

The heat then encounters the concentric diffusion interface of the CuNi alloy coolant pipes and fittings to the bulk copper material of the casting. That part will be low in thermal resistance if the fused materials are solid. Once through the concentric diffusion interface, the heat must travel through the wall thickness of the CuNi alloy coolant pipes and fittings to reach the interior and the flowing coolant. Thin wall, ASTM Schedule-40 pipes and fittings help to keep this constituent part very small overall.

The magnitude of the thermal resistance of the interiors of the CuNi alloy coolant pipes and fittings to the coolant itself is a function of the interior geometry, materials, and fluid type flow velocity of the coolant within. E.g., the convective heat coefficient.

Any hot spots inside the CuNi alloy coolant pipes and fittings are identified and analyzed with CFD/FEA computer modelling over a range of flow velocities and temperatures. These hot spots will be early sources of boiling that produce either steam bubbles or film boiling. Some bubbles will form and immediately collapse, but film boiling will produce much longer lasting volumes. Bubble formation can produce violent shaking and vibrations in the coolant hose connections that are an indication of trouble to operators.

Such CFD/FEA computer modelling also produces a field performance table that can be indexed from thermocouple measurements. These are useful to gauge what coolant velocities will be required, and correlate to copper block and pipe temperatures.

Fusion is characterized by a zone of intermixing of the metals in the pipe and the cast around copper, with crystal grains that grow from the pipe into the copper. If grain grown fusion fails to materialize, x-rays will show the outside of the pipe as a clear line in the images. If fusion occurred, the outside of the pipe will not be clearly visible in x-ray images and ultrasonic measurements will measure deeper to the inside of the pipe. Both such nondestructive techniques are used to check for fusion.

Without good fusion, the initial thermal contact between the copper and the pipe may be sufficient so that the lack of bond would not be detected with infrared testing. If a furnace-block cooler is cycled and the pipe was not bonded, the cast around copper may separate further during the campaign life of the component, thereby negatively influencings its heat removal capacity.

The casting temperature is critical as is the control of the amount of deoxidants and shielding of the surface of the molten copper from oxygen.

The fusion bonding between the CuNi alloy coolant pipes/fittings and the casting proceeds in an unusual way. No heat or filler material is added in to join two relatively cold base metal pieces. Instead, the CuNi alloy coolant pipes/fittings begin as a solid base metal and a hot superheated casting pour of liquid copper is flooded in.

The whole surface area of the outer skins of the CuNi alloy coolant pipes/fittings are nucleation points for the formation and growth of copper crystal grains. These will grow into the bulk of the surrounding casting as it cools and solidifies.

The casting temperature is therefore critical, too hot and the CuNi alloy coolant pipes/fittings walls will completely melt through and could lose shape. Not being hot enough will fail to bring in enough energy to melt the whole surface area of the outer skins of the CuNi alloy coolant pipes/fittings. In which case the metallurgical bonds will fail to develop or fail in service.

The right casting temperatures to use here are empirically derived by trial-and-error. Experience can be helpful in being able to start the trials initially at close to a best casting temperature.

A fusion zone (FZ) begins and ends at the portions of the material that have been coalesced, and will have a chemical composition that is a mixture of the substrates being fused together and any additional filler material that may have been used.

In the FZ, the solidification occurs by epitaxial growth, in which the atoms in the molten metal solidify at the preexisting lattice sites in the unaffected base metal. The grain structure in the FZ are oriented roughly perpendicular to the concentric diffusion interface. This results in coarse columnar grains in the FZ.

A heat-affected zone (HAZ) is an area of metal base material which is not melted but has had its microstructure and properties altered by fusing heat. Two parts, solid solution zone and softened zone.

Coarse columnar structures are susceptible to hot cracking, whereas finer grain structures, distorted columnar structures, and equiaxed structures are more resistant to hot cracking. The fusion zone grain structure has a strong influence on the mechanical properties of the joint.

Grain growth is epitaxial in nature, the size of the grains in the base metal controls the final grain size to a limited extent. The average growth direction during solidification of a fuse pool is approximately normal to the concentric diffusion interface, which is also along the maximum temperature gradient, a given grain will not be favorably oriented during the entire solidification process since the direction of this gradient changes. Therefore, many of the grains at the fusion line that are initially of unfavorable orientations may become more favorably orientated.

A major difference between the solidification of a casting and that of a fuse (aside from the relative size and cooling rates) is the phenomenon of epitaxial growth in fuses. In castings, formation of solid crystals from the melt requires heterogeneous nucleation of solid particles, principally on the mold walls, followed by grain growth. For fuse solidification, there is no nucleation barrier, and solidification occurs spontaneously by epitaxial growth. The nucleation event in fuses is eliminated during the initial stages of solidification because of the mechanism of epitaxial growth wherein atoms from the molten fuse pool are rapidly deposited on preexisting lattice sites in the adjacent solid base metal.

As a result, the structure and crystallographic orientation of the HAZ grains at the concentric diffusion interface continue into the fusion zone. In fact, an exact location of a concentric diffusion interface is very difficult to determine in any fuse deposited on the metals using matching filler metal. Even microstructural features, such as annealing twins located in the HAZ fuse joints, will continue to grow epitaxially into the fuse during solidification. Epitaxial growth is always the case during autogenous fusing. For non-autogenous processes in which a filler metal is used, epitaxial growth may still occur.

However, the more classical case of heterogeneous nucleation also applies in this case. In fuses, growth of the solid progresses from the unmelted grains in the base metal, And the stability of the concentric diffusion interface is critical in determining the microstructural characteristics of the fuse metal. The thermal conditions in the immediate vicinity of the concentric diffusion interface determine whether the growth occurs by planar, cellular, or dendritic growth. Composition gradients and thermal gradients ahead of the concentric diffusion interface are of primary importance.

In summary, furnace-block cooler embodiments of the present invention with a hot face and include multiple circuits of a copper-nickel (CuNi) alloy coolant pipe inside a copper casting. The improvements over conventional furnace-block coolers comprise a concentric diffusion interface continuously fusing and metallurgically bonding between an outside surface area of a CuNi alloy coolant-pipe and inside a surrounding and solidified copper casting.

A thermal buffer of copper is solidified inside the copper casting between the hot face and a front facing span of the CuNi alloy coolant-pipes. Such provides a means for a rough, uniform spreading of heat flow from the hot face into each front facing span of CuNi alloy coolant-pipe.

An additional thickness of solidified copper is added to the thermal buffer. This alone sacrificially accommodates subsequent wear, corrosion, and/or oxidation of the hot face, and that was calculated in CFD/FEA computer modelling of a 3D-CAD design of the furnace-block cooler to be a minimum necessary for a thermal buffer about 25-32 millimeters (mm) thick if a hot face pattern is included, or about 38-mm if the hot face is not patterned.

The interior spaces of the thermal buffer directly between the hot face and the nearest coolant pipes must be free of all chaplets, spacers, or other support devices that were necessary elsewhere internally to hold a position of the CuNi alloy coolant-pipes until the copper casting solidified. Preferably, the CuNi alloy coolant-pipes are substantially comprised of UNS C70600 90%, C71300 75%, C71500 70%, C71640 66%, or UNS C70600 ASTM Schedule-40 water pipe and butt-welded fittings. Some ASTM Schedule-80 may be advantageously included in the inlets and outlets.

The multiple circuits of CuNi alloy coolant pipe are each and all synonymous, independent, and about equal in their heat removal capacity via their own respective coolant inlets and outlets. Each of the multiple circuits of CuNi alloy coolant pipe include an internal geometry that is manipulated in 3D-CAD design to produce a similar and matching drop in inlet-to-outlet coolant pressure for a given coolant velocity. A given heat load applied to the hot face is about equally shareable and removable by each CuNi alloy coolant pipe circuit. The bottom-line is furnace-block cooler embodiments of the present invention have a heat removal capacity of at least four times an average heat flux in excess of 25 kW/m$^2$.

Method embodiments of the present invention require that before committing to the casting of a particular copper furnace-block cooler in a foundry, computational fluid dynamics (CFD) and/or finite element analysis (FEA) computer modelling must have verified internal point-by-point temperatures under simulated heat flows. Peak temperatures at every point, and differential temperatures amongst points, must be verified to stay within bounds set by the materials themselves and the geometries in the design. Here, each particular geometric design for a copper furnace-block cooler will be checked for its heat removal capacity under given thermal boundary conditions from a hot face exposed to an average heat flux in excess of 25 kW/m$^2$.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method for the geometric design and subsequent manufacturing of a copper furnace-block cooler, comprising:

casting a copper furnace-block cooler in a foundry, and before said casting, simulating with computational fluid dynamics (CFD) and/or finite element analysis (FEA) a corresponding computer modelling of a particular geometric design for the copper furnace-block cooler that the heat removal capacity from an included hot face an average heat flux is in excess of 25 kW/m$^2$;

solidifying a front copper cover and thermal buffer at a minimum of about 25 mm thick if the included hot face is patterned, or about 38 mm if the included hot face is not patterned, from a hot liquid pour that is included in a casting of the copper furnace-block cooler and simulating with the CFD/FEA that heat flows evenly distribute between the included hot face and a circuit of Schedule-40 copper-nickel (CuNi) alloy coolant pipe positioned inside the casting of the copper furnace block cooler that fused in its entirety inside along a CuNi—Cu interface between them;

testing with a non-invasive, non-destructive method for a quality control screening of the copper furnace-block coolers that a complete fusing and metallurgical bonding of the CuNi alloy coolant pipe of its entirety developed within the surrounding and solidified copper casting;

wherein, the copper furnace-block coolers passing the testing and screening will have sufficient fusing and metallurgical bonding that thermal conductivity remains stabile after bridging a subsequent thermal cycling;

before casting the copper block, further simulating with computational fluid dynamics (CFD) and/or finite element analysis (FEA) and in computer modelling of the particular geometric design for the copper furnace-block cooler that the operational temperatures of the hot face will not exceed 450° C. when the heat removal capacity from the hot face for the average heat flux is in excess of 25 kW/m$^2$;

wherein, excessive oxidation and copper material loss of the hot face that would cause film boiling in the coolant due to insufficient heat spreading are prevented; and wherein, excessive temperature rises of any part of the circuit of CuNi alloy coolant pipe that would otherwise film boil or degrade the coolants within are also prevented.

2. The method of claim 1, wherein:

the testing includes x-ray and/or ultrasound imaging of the fusing and metallurgical bonding of the CuNi alloy coolant pipe to reject any copper furnace-block coolers that had not shown in said imaging fused and metallurgically bonded evidence of the circuit of copper-nickel (CuNi) alloy coolant pipe in its entirety inside along the interface;

wherein, the copper furnace-block coolers that are not rejected would otherwise include disruptions of its overall internal thermal conduction.

3. The method of claim 1, further comprising:

adding an additional thickness beyond said minimum to the front copper cover and thermal buffer at the hot face, and before casting, that accommodates a predicted amount of wear, abrasion, corrosion, and oxidation of the hot face over a predetermined campaign life;

wherein, film boiling or thermal degradation in the coolant is avoided for the entire predetermined campaign life.

4. A method for the geometric design and subsequent manufacturing of a copper furnace-block cooler, comprising:

casting a copper furnace-block cooler in a foundry, and before said casting, simulating with computational fluid dynamics (CFD) and/or finite element analysis (FEA) and a corresponding computer modelling of a particular geometric design for the copper furnace-block cooler that the heat removal capacity from an included hot face an average heat flux is in excess of 25 kW/m$^2$;

solidifying a front copper cover and thermal buffer at a minimum of about 25 mm thick if the included hot face is patterned, or about 38 mm if the included hot face is not patterned, from a hot liquid pour that is included in a casting of the copper furnace-block cooler and simulating with the CFD/FEA that heat flows evenly distribute between the included hot face and a circuit of Schedule-40 copper-nickel (CuNi) alloy coolant pipe positioned inside the casting of the copper furnace block cooler that fused in its entirety inside along a CuNi—Cu interface between them;

testing with a non-invasive, non-destructive method for a quality control screening of the copper furnace-block coolers that a complete fusing and metallurgical bonding of the CuNi alloy coolant pipe of its entirety developed within the surrounding and solidified copper casting;

wherein, the copper furnace-block coolers passing the testing and screening will have sufficient fusing and metallurgical bonding that thermal conductivity remains stabile after bridging a subsequent thermal cycling;

a series of steps in the corresponding computer modelling for iteratively adjusting within the particular geometric design a candidate geometry and a position of the circuit of CuNi alloy coolant pipes both relative to a hot face and within the casting and subsequent solidification in the surrounding copper furnace-block cooler;

a series of steps for a foundry casting and subsequent solidification of the circuit of CuNi alloy coolant pipes within the casting in the surrounding copper furnace-block cooler according to a last iteration of the candidate geometry and a position in which CFD/FEA fixed a position of the circuit of CuNi alloy coolant pipes that includes a separation distance to the hot face in the range of about 25-38 mm that is dependent within the range on the presence of any hot face patterning;

wherein, a thermal buffer of solidified copper is formed inside the casting within the entirety of the separation distance to the hot face and therefore has a proportionate thickness sufficient to buffer and distribute the heat load and prevents the appearance in the CFD/FEA computer modelling of an isotherm ripple across the hot face able to generate thermal shear forces and stresses enough to cause copper crystal grain cracking;

wherein, the thermal conduction of the thermal buffer is simulated by the CFD/FEA computer modelling in a series of steps for iterative adjustment of increases in its designed thickness to be sufficient in an interior point-by-point temperature analysis to evenly distribute heat flow internally from the hot face across the circuit of CuNi alloy coolant pipes during simulated operation and to verify in simulation that operational hot face temperatures will be limited to 450° C.

5. A method for the geometric design and subsequent manufacturing of a copper furnace-block cooler, comprising:

casting a copper furnace-block cooler in a foundry, and before said casting, simulating with computational fluid dynamics (CFD) and/or finite element analysis (FEA) a corresponding computer modelling of a particular geometric design for the copper furnace-block cooler that the heat removal capacity from an included hot face an average heat flux is in excess of 25 kW/m$^2$;

solidifying a front copper cover and thermal buffer at a minimum of about 25 mm thick if the included hot face is patterned, or about 38 mm if the included hot face is not patterned, from a hot liquid pour that is included in a casting of the copper furnace-block cooler and simulating with the CFD/FEA that heat flows evenly distribute between the included hot face and a circuit of Schedule-40 copper-nickel (CuNi) alloy coolant pipe positioned inside the casting of the copper furnace block cooler that fused in its entirety inside along a CuNi—Cu interface between them;

testing with a non-invasive, non-destructive method for a quality control screening of the copper furnace-block coolers that a complete fusing and metallurgical bonding of the CuNi alloy coolant pipe of its entirety developed within the surrounding and solidified copper casting;

wherein, the copper furnace-block coolers passing the testing and screening will have sufficient fusing and metallurgical bonding that thermal conductivity remains stabile after bridging a subsequent thermal cycling;

taking only a dissipating heat from the hot liquid of the casting for a one-time heat absorption into and melting of an outside surface of the circuit of CuNi ally coolant pipe to form the CuNi—Cu interface.

6. The method of claim 5, further comprising:

a step for applying a calorized layer of aluminum externally to at least the hot face after its solidification and that improves its operational resistance to abrasion and burn through.

7. The method of claim 5, further comprising:

adding additional circuits of CuNi alloy coolant pipe that are each and all synonymous, independent, and about equal in heat removal capacity via their own respective coolant inlets and outlets;

wherein each circuit of CuNi alloy coolant pipe is arranged to include an internal geometry that produces a similar and matching drop in inlet to outlet coolant pressure for a given coolant velocity passed through it; and wherein a given heat load applied to the hot face is about equally shareable and removable by each circuit of CuNi alloy coolant pipe.

8. The method of claim 5, further comprising:

flush welding copper into and inside any surface of the copper casting to cover any part of a chaplet, spacer, or other molding device that would otherwise penetrate a copper furnace-block cooler surface and be left exposed.

9. The method of claim 5, further comprising:

embedding a thermocouple and a metallurgical bonding of a thermowell or tubing of copper-nickel alloy, wherein any temperature readings obtainable are improved in accuracy.

* * * * *